United States Patent [19]

Cvek

[11] Patent Number: 5,333,103
[45] Date of Patent: Jul. 26, 1994

[54] HALOGEN LAMP

[75] Inventor: Sava Cvek, Boston, Mass.

[73] Assignee: Luxo Lamp Corporation, Port Chester, N.Y.

[21] Appl. No.: 795,339

[22] Filed: Nov. 20, 1991

Related U.S. Application Data

[63] Continuation-in-part of Ser. No. 677,259, Mar. 29, 1991, Pat. No. 5,097,400.

[51] Int. Cl.⁵ .................................................. F21S 1/12
[52] U.S. Cl. ..................... 362/413; 362/402; 362/419; 362/427
[58] Field of Search ............... 362/269, 287, 294, 345, 362/351, 402, 403, 410, 413, 419, 431, 434, 427

[56] References Cited

U.S. PATENT DOCUMENTS

| | | | |
|---|---|---|---|
| 641,748 | 1/1900 | Smith | 362/413 |
| 1,193,894 | 8/1916 | Harvey | 362/269 |
| 1,854,302 | 4/1932 | Hansen | 362/427 |
| 3,543,019 | 11/1970 | Jacobsen | 362/413 |
| 4,449,172 | 5/1984 | Warshawsky | 362/419 |
| 4,581,689 | 4/1986 | Oram | 362/287 |
| 4,819,138 | 4/1989 | Polick | 362/419 |
| 5,016,153 | 5/1991 | Gismondi et al. | 362/402 |

FOREIGN PATENT DOCUMENTS

| | | | |
|---|---|---|---|
| 152275 | 7/1953 | Australia | 362/413 |
| 362143 | 7/1962 | Switzerland | 362/419 |
| 871710 | 6/1961 | United Kingdom | 362/419 |

Primary Examiner—Ira S. Lazarus
Assistant Examiner—Y. Quach
Attorney, Agent, or Firm—Fitzpatrick, Cella, Harper & Scinto

[57] ABSTRACT

A lamp assembly is disclosed which includes a base, a lamp arm mounting adapter on the base for pivotally mounting a lamp arm thereto, with the lamp arm itself having a first pair of hollow support tubes mounted on the adapter for pivotal movement on a vertical axis in a generally horizontal plane and having a arm support pivotally mounted on their opposite ends for pivotal movement on a vertical axis on a horizontal plane. A second pair of arms having inner and outer ends are pivotally mounted on their inner ends to the arm support for pivotal movement about a horizontal axis in a vertical plane. A counterbalance spring is connected between the arm support and the second pair of arms and a lamp head is pivotally connected on the outer end of the second pair of arms for pivotal movement at least about a horizontal axis in a vertical plane.

16 Claims, 12 Drawing Sheets

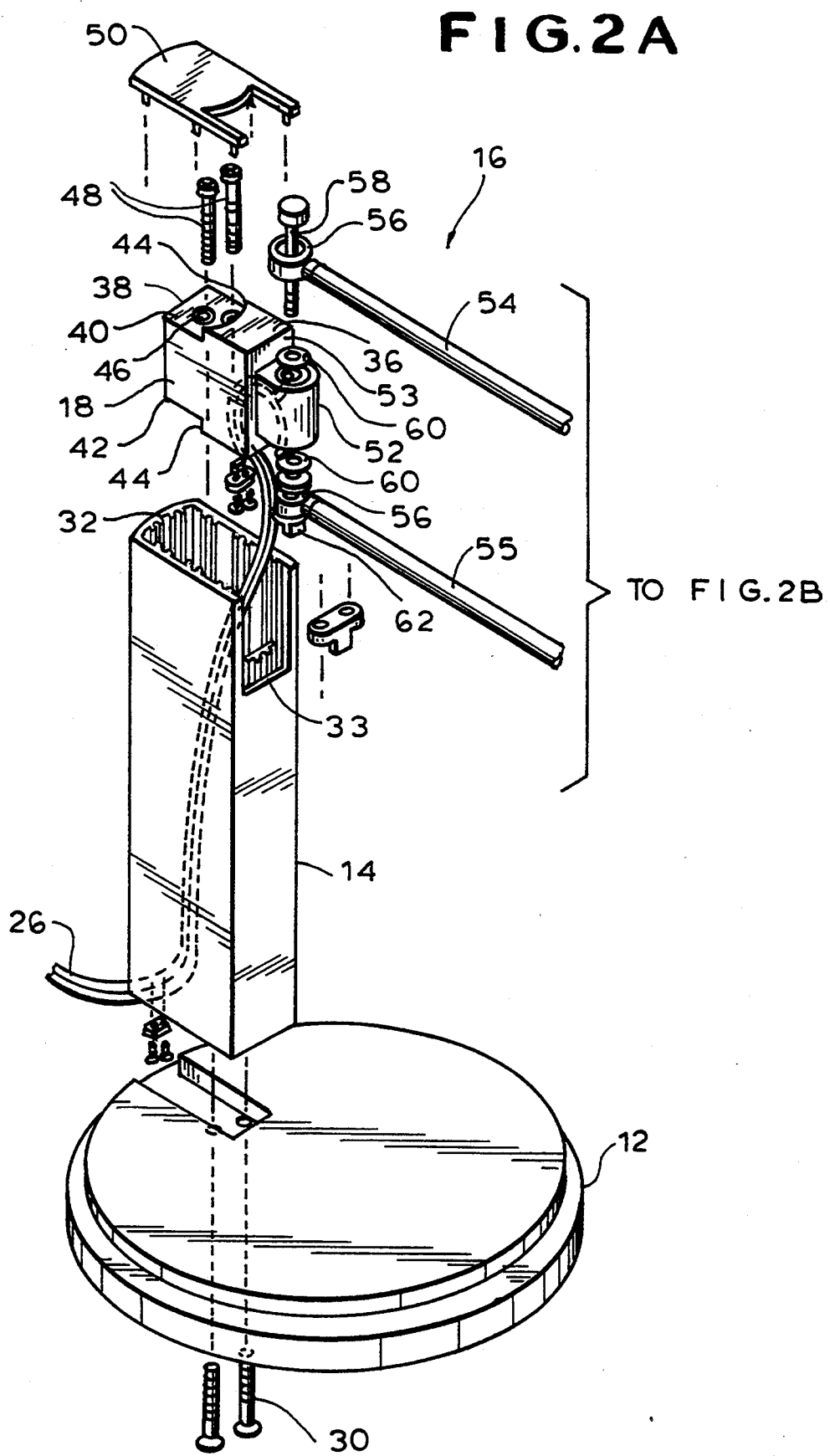

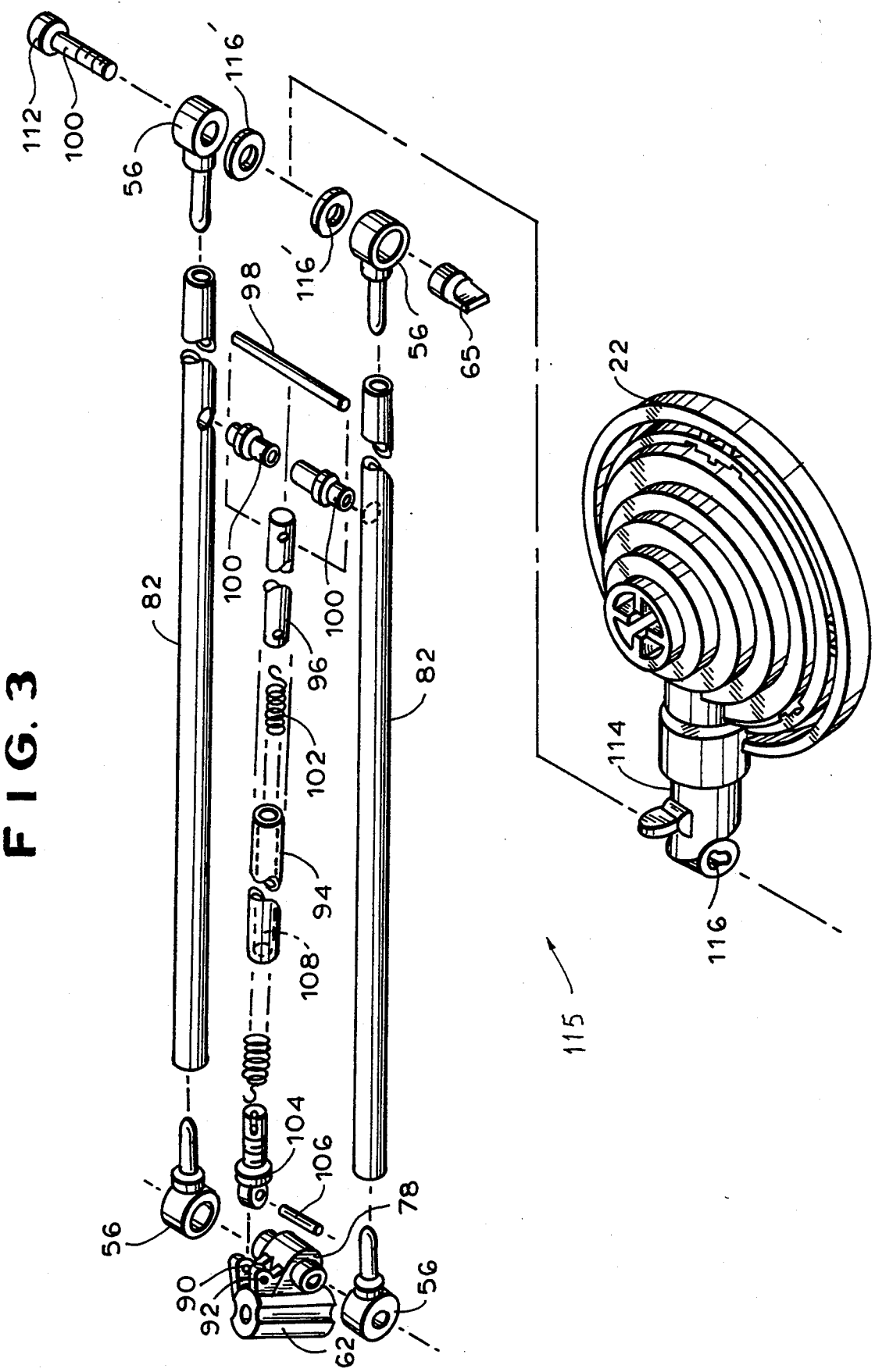

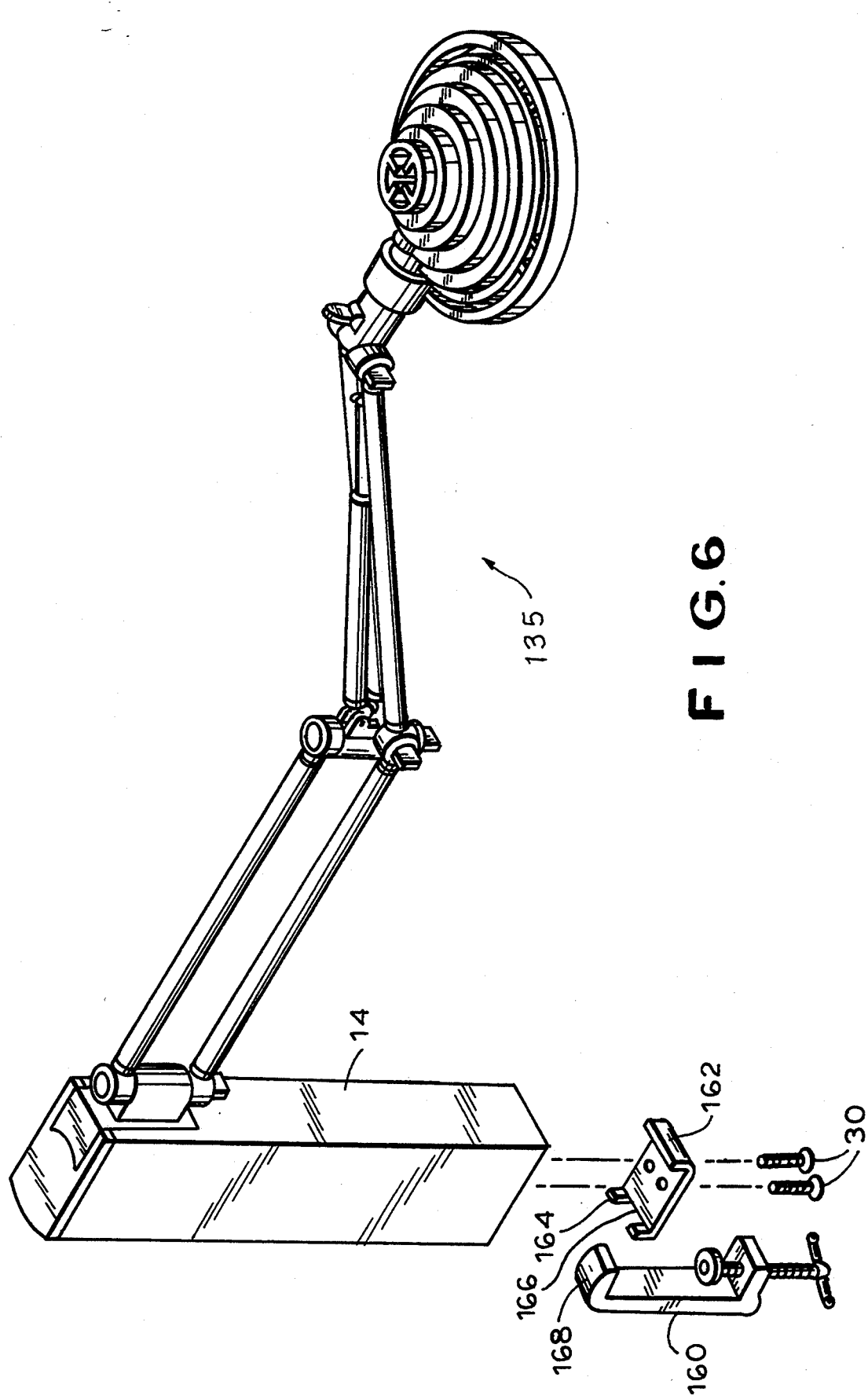

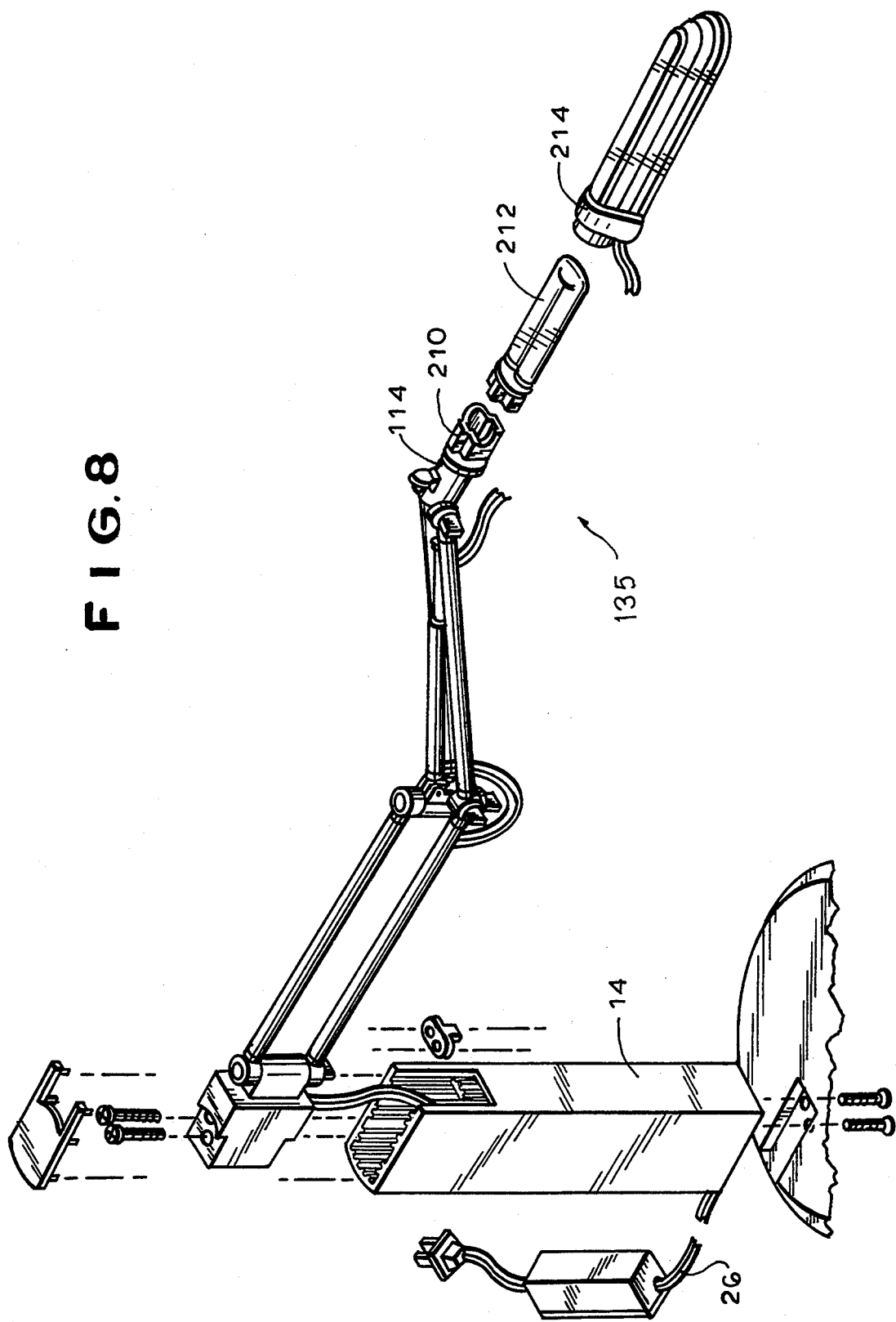

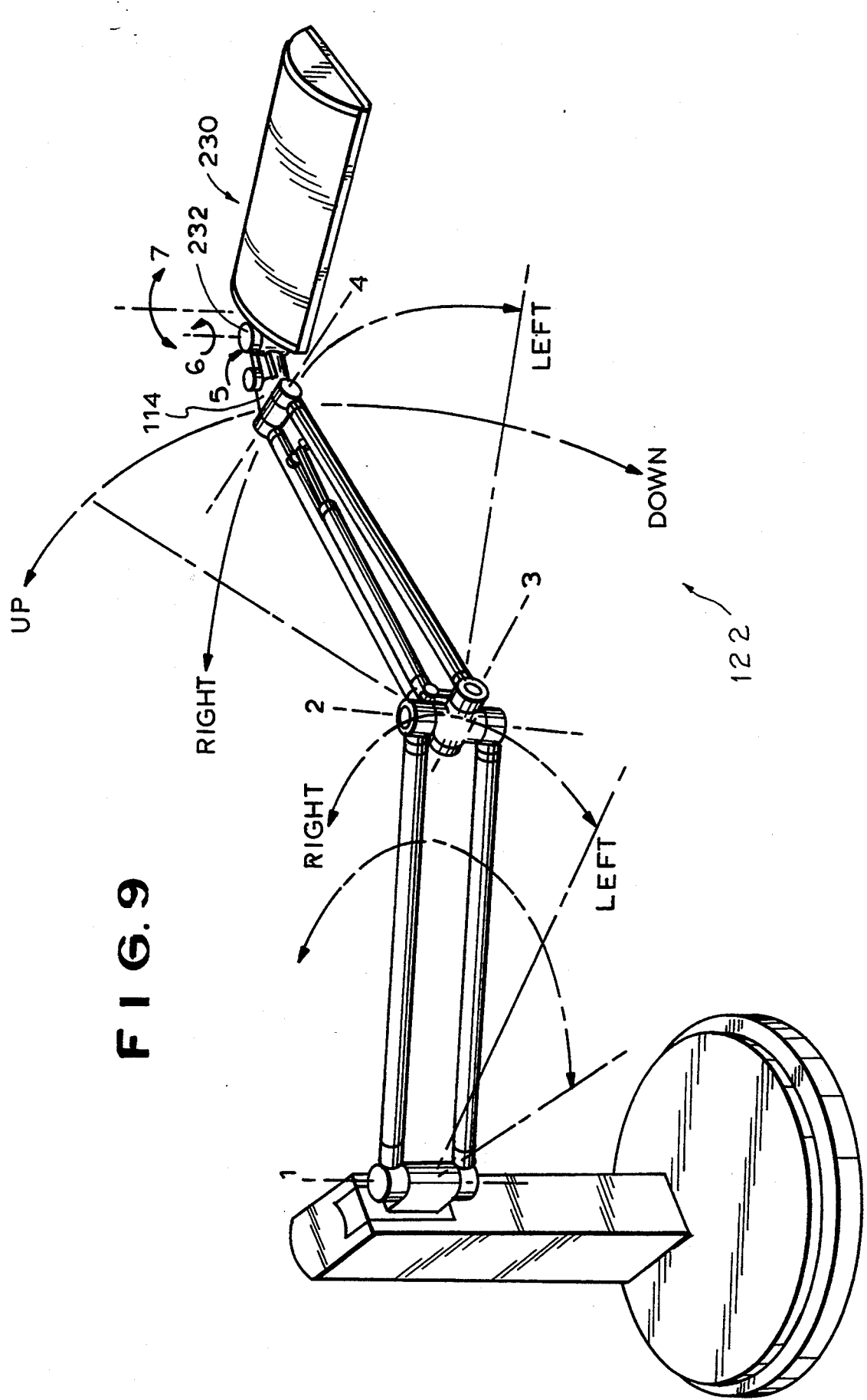

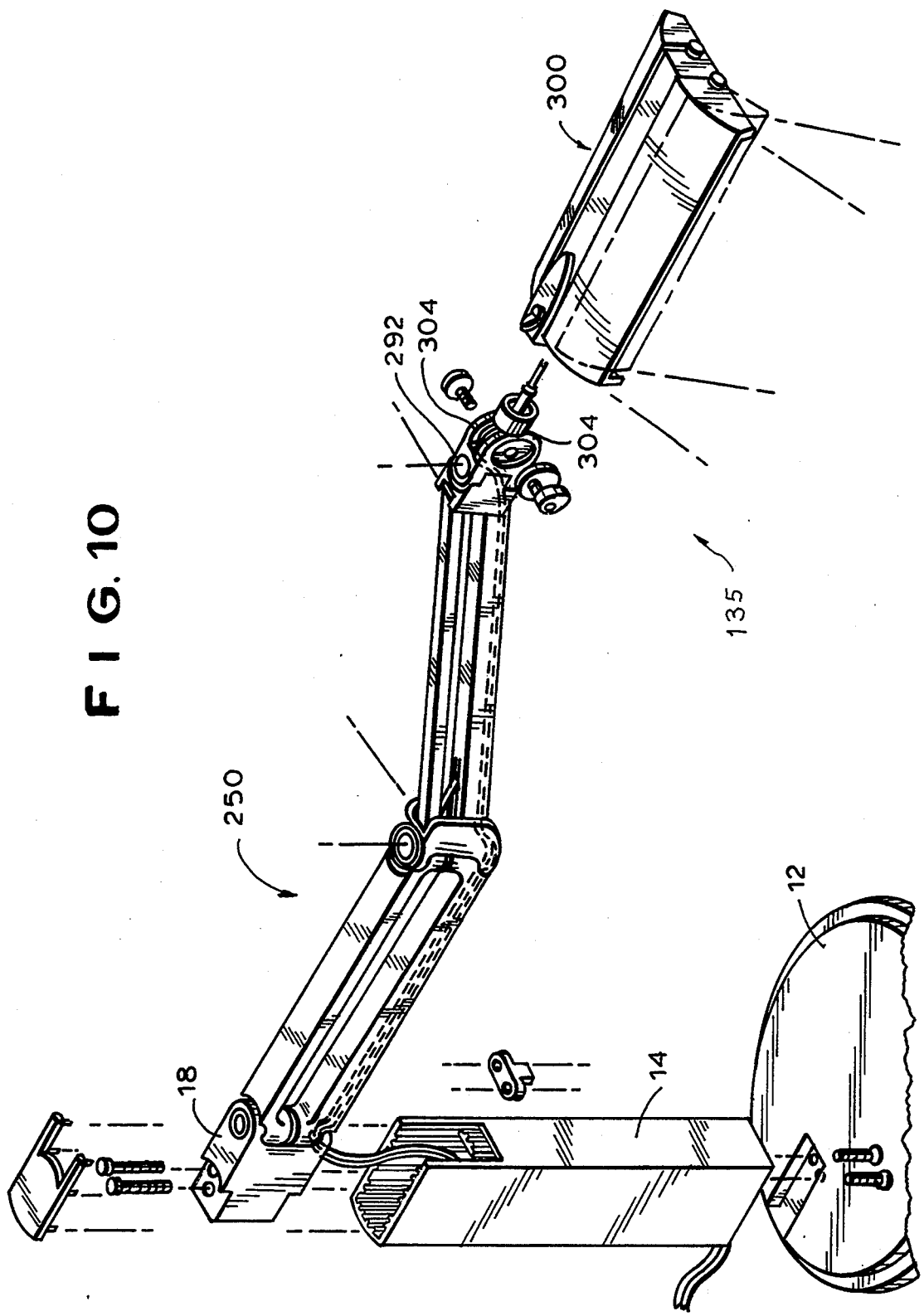

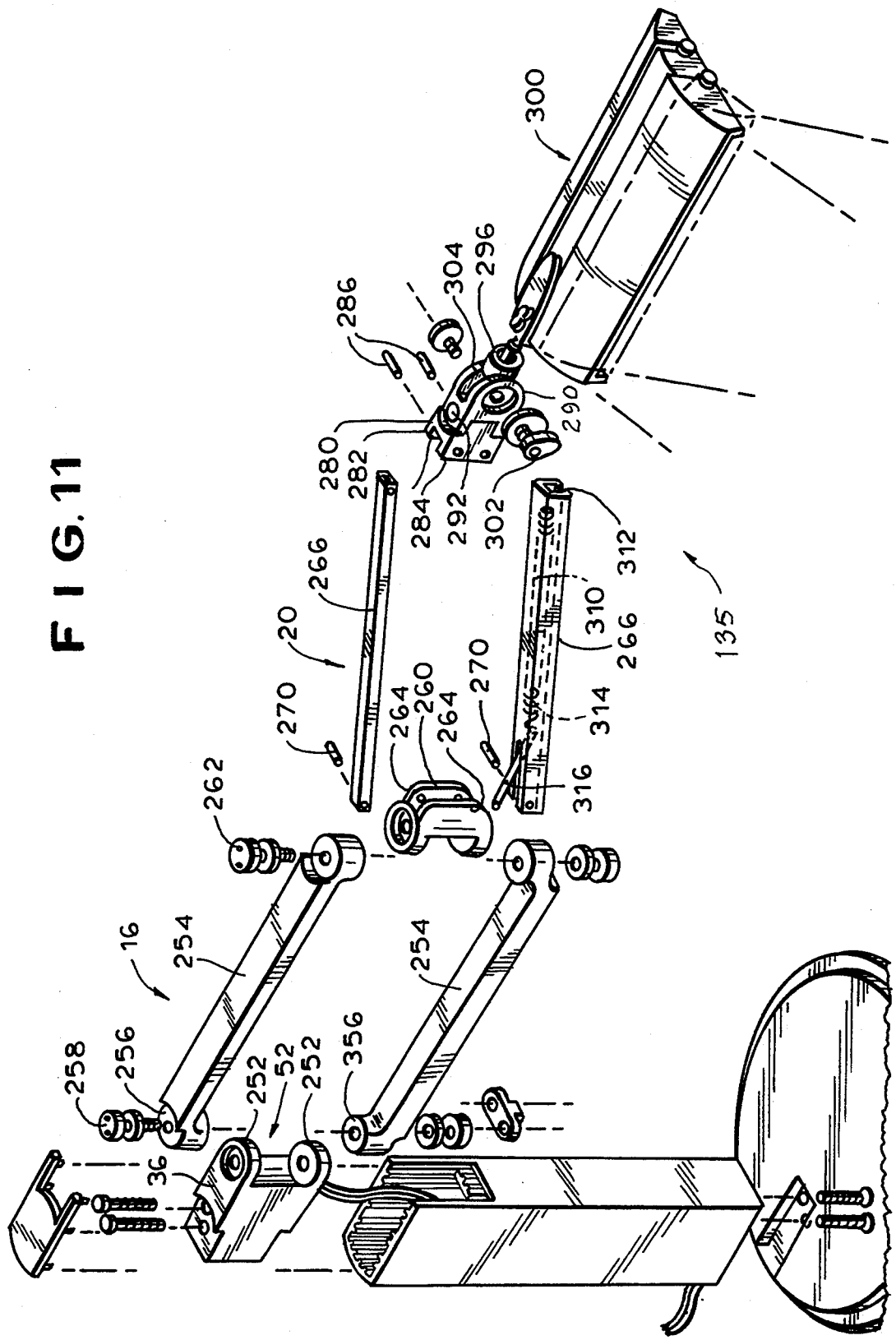

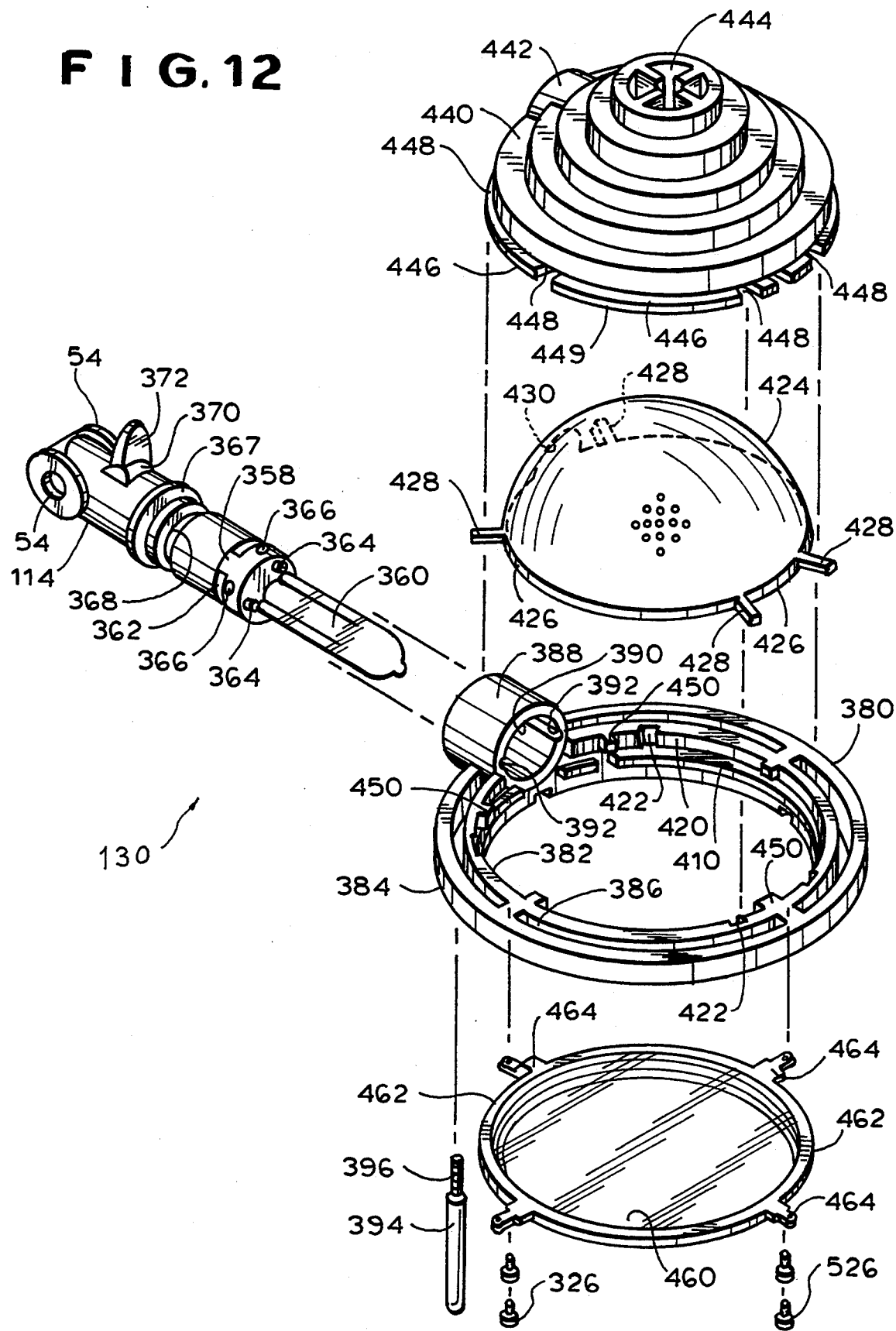

HALOGEN LAMP

This application is a continuation-in-part of U.S. patent application Ser. No. 677,259, filed Mar. 29, 1991, now U.S. Pat. No. 5,097,400 the disclosure of which is incorporated herein by reference.

The present invention relates to a spring balanced arm assembly and more particularly to a spring balance arm and lamp head assembly adapted for use with high heat intensity halogen lamp bulbs.

In recent years, the lighting industry has developed new forms of bulbs for use in light fixtures. One such bulb which has been particularly successful is the halogen light bulb for use in desk lamps or the like in place of conventional fluorescent or incandescent bulbs. Typically these bulbs have a 50 watt rating and use 12 volt current. These lamps are efficient and economical to use, but also produce a clear crisp white light which is stronger and more intense than the light produced by conventional fluorescent or incandescent bulbs. One deficiency of such bulbs is that in addition to the intense light produced, they also produce intense heat.

Because of the high heat produced by halogen bulbs, it has only been recently that such bulbs have come to be used for interior lighting fixtures such as desk lamps. Their use previously has been limited to exterior fixtures in remote positions where they are not likely to be touched by the user or passers by. With the development of smaller bulbs, the desire to use these efficient and high quality bulbs in desk lamps and the like has been increased. Unfortunately such lamps have not met UL standards because the heat they produce makes it potentially dangerous for the user to touch the lamp shade in which the bulb is placed.

My prior patent application, identified above, is directed in part to a lamp head assembly for a halogen lamp bulb which would meet UL standards and provide a safe desk lamp. The construction of the counterbalanced arm used in the lamp of that application permitted movement of the lamp head in multiple directions, so that the lamp had a great degree of flexibility.

It is an object of the present invention to provide a further improved spring balanced arm light fixture adapted to use high heat intensity halogen bulbs and which has multiple degrees of freedom of movement for the lamphead.

Another object of the present invention is to provide a lamphead assembly which may be safely used as a desk lamp fixture.

In accordance with an aspect of the present invention a lighting fixture or desk lamp is provided which utilizes a UL approved lamphead assembly such disclosed in my prior U.S. patent application Ser. No. 677,259. The arm support arrangement for the lamp head permits multiple degrees of movement of the lamp head about a base assembly. The fixture includes a mounting adapter for securing the lamp head assembly to any of a variety of different kinds of bases while permitting the same freedom of movement as in the original desk lamp base.

The above, and other objects, features and advantages of this invention will be apparent in the following detailed description of illustrative embodiment thereof, which is to be read in connection with the accompanying drawings, wherein:

FIGS. 2A and 2B are the exploded perspective view of the lamp shown in FIG. 1;

FIG. 3 is an exploded perspective view of the upper spring balanced arm of the lamp of the present invention;

FIG. 6 is a perspective view of another mounting arrangement for the lamp of the present invention;

FIG. 8 is a partial exploded perspective view of the lamp of this application using a fluorescent bulb in lieu of halogen incandescent bulb;

FIG. 9 is a perspective view of yet another embodiment of the present invention;

FIG. 10 is a partially exploded perspective view of a still further embodiment of the present invention;

FIG. 11 is an exploded perspective view of the embodiment of FIG. 10 and

FIG. 12 is an exploded perspective view of the lamp head assembly used with the present invention.

Figure 1:
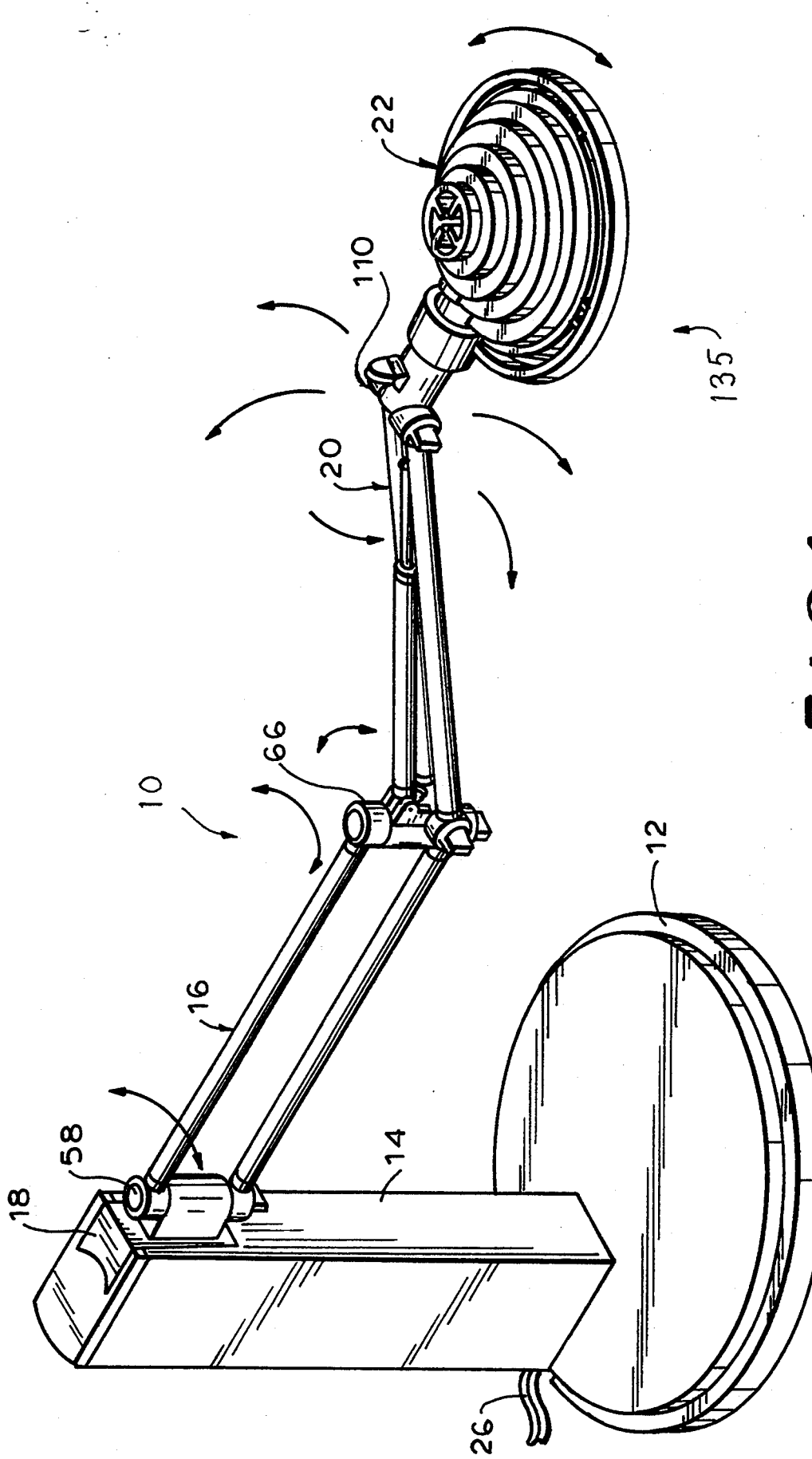
FIG. 1 is a perspective view of a lamp assembly constructed in accordance with the present invention.

Referring now to the drawings in detail, and initially to FIG. 1 thereof, a spring balanced light fixture or desk lamp 10, constructed in accordance with the present invention is illustrated. As mentioned above, this lamp is particularly adapted for use with a halogen low voltage bulb.

Lamp 10 includes a circular support base 12 adapted to be placed on a desk or other work surface. A mounting post 14 extends upwardly from base 12 and a pair of lower support arms 16 are pivotally mounted on the post through a mounting adapter 18 as described hereinafter. An upper pair of support arms 20 are pivotally mounted to the ends of arms 16. These support arms may be spring balanced support arms, as described hereinafter and in detail in U.S. patent application Ser. No. 677,259, or they may be supported without the use of the counterbalance spring in a shorter construction, as shown for example in the embodiment of FIG. 12 of said application. In either event, a lamp head assembly 22 which contains a halogen bulb, is pivotally mounted on the upper ends of the arms 20.

In the illustrative embodiment of the invention, power is supplied to the lamp through a transformer (not shown) which is adapted to be connected to a source of 120 volt current. The transformer reduces the current to 12 volts which is then supplied by a wire 26 to the lamp. As described hereinafter, using low voltage current in this way the arms 16, 20 themselves serve as conductors, so that no internal wiring is necessary in the arms.

Figure 2B:
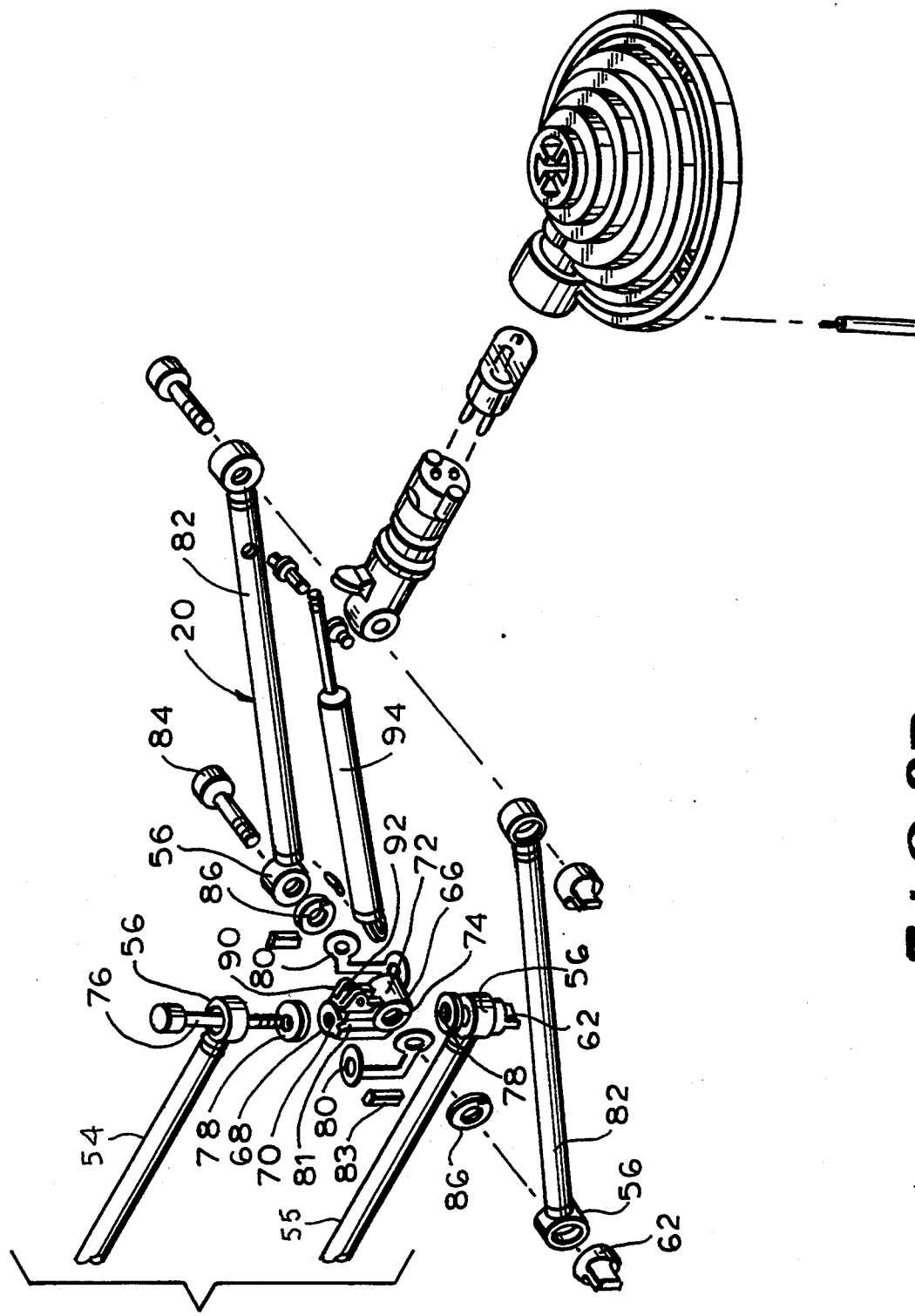

Referring now to FIG. 2 of the drawing, it is seen that the support or base 12 is a heavy circular metal disk which can sit on a desk or other work surface. The vertical hollow support post 14 is secured to base 12 by screws 30 or the like. In this regard, the interior surface of post 14 is formed with a plurality of small inwardly opening channels 32 which can receive and hold the self-threading screws 30. Thus the screws 30 pass through base 12 into the open lower end of the post 14 and thread themselves into cooperating channels 32 formed in the post thereby to hold the post rigidly to the base.

The arm assembly of the light fixture of the present invention is secured to post 14 by the mounting adapter 18. The latter is designed and constructed to enable the lamp fixture to be secured to a variety of different support structures, in addition to the post 14, as described hereinafter.

Mounting adapter 18 is formed of a rigid block of material having a first section 36 which is somewhat larger than the smaller rear or second section 38. The latter has upper and lower surfaces 40, 42 formed thereon which are stepped down from the upper and lower surfaces of the section 36 by arcuate steps or surfaces 44. Adapter section 38 also has a pair of through bores 46 formed therein which receive the screws 48. The latter are engaged in open channels 33 formed on the interior surface of post 14 to secure the mounting adapter to the post. Preferably the mounting adapter section 38 is covered by a cap 50 which is snap fit into the top of the post 14 after the adapter is secured therein.

Mounting adapter 18 includes a pivot boss 52 on its front face 53. The arms 54, 55 of the pair of arms 16 are formed of hollow metal tubes having bosses 56 received in their free ends. These bosses have apertures formed therein which in turn receive a pivot bolt 58 which is mounted in boss 52.

As seen in FIG. 2, wire 26 extends up through arm 14, through a bore in mounting adapter 18 and its free ends are soldered or otherwise connected to metal washers 60 positioned on opposite sides of boss 52 where they engage the bosses 56 of arms 54, 55. Thus, current is supplied from the wires directly to arms 54, 55.

The arms are secured pivotally to the pivot boss 52 by a fingernut 62 which engages the threaded end of the bolt 58 when the lamp is assembled. This arrangement permits the first pair of arms 16 to pivot on a vertical axis in a horizontal plane as indicated by the arrow in FIG. 1.

The opposite ends of arms 54, 55 are pivotally mounted in an arm support 66 which may be formed of a thermo plastic material. Arm support 66, as seen in FIGS. 1 and 2, has a first section 68 including a vertical bore 70 formed therein and a second section or boss 72 having a horizontal bore 74 formed therein. The arms 54, 55 are pivotally connected to arm support 66 by a pivot bolt 76 which is received in bore 70. Metal washers 78 are provided on opposite sides of the arm support 66 to transfer current through metal adapters 80 to the upper arm assembly 20. These adapters fit in recesses 81 formed in the sides of support 66 and in the finally assembled lamp are concealed by snap fit covers 83.

The mounting arm support 66 can pivot on the bolt 76 to permit the upper arm assembly to pivot on a vertical axis about the bolt 76 in the horizontal direction, as seen in FIG. 1. The assembly is retained in this pivotal connection by the fingernut 62 secured to the lower end of the bolt 76.

The upper arm assembly 20 consists of a pair of arms 82 which are formed as hollow metal tubes. As seen in FIG. 2, these tubes have bosses 56 mounted in their ends in the same manner as described above with respect to arm assembly 16. The lower pair of bosses 56 receive a pivot bolt 84 which passes therethrough and through the bore 74 in arm support 66. Current is conducted from the lower pair of arms to the upper pair of arms through the adaptors 80, previously described, and adjacent metal washers 86. The arrangement is held assembled by the fingernut 62 secured to the end of bolt 84.

Arm support 66 includes a pair of flanges 90 extending therefrom and having pivot holes 92 formed therein. To counterbalance the arm assembly a spring assembly 94 is connected to the arm support at the flanges 90. This spring assembly includes a rigid rod 96 pivotally connected by a pin 98 to the arms 82 (See FIG. 3). The pivotal connection is preferably formed by a pair of polycarbonate sleeves 100 press fit in openings formed in the arms 82 and receiving the ends of the pin 98. The latter passes through a bore formed in the upper end of the rod 96.

The lower end of the rod 96 is connected to a tension spring 102. The lower end of the tension spring is connected to the free end of a threaded stud 104. The latter has a head pivotally connected by a press fit pin 106 secured in the bore 92 of the flanges 90 in arm support 66. Preferably the spring 102 and a portion of the rod 96 are surrounded by a cylindrical tube 108 having a threaded lower end which threadedly engages the stud 104. As a result, cylindrical tube 108 is held in place and serves to conceal both the spring and the connection of the spring 102 to rod 96.

The upper ends of arms 82 have the sleeves or bosses 56 previously described mounted therein. A threaded bolt 110 having a head 112 connects the sleeves to the lamp head assembly 22. The latter includes a neck 114 whose rear end has a bore 116 formed therein to receive the shank of the bolt 110 between the bosses 56 at the upper ends of the arms 82. The free opposite end of the bolt 110 is threadedly engaged with the fingernut 65 to hold the assembly together and to provide an adjustable clamping force.

In order to transmit electric current to the lamp head assembly a pair of metallic washers 116' are provided in contact between the interfaces of the sleeves 56 and the adjacent surfaces of neck 114. The latter is formed of a plastic polycarbonate material and is non-conductive. Washers 116' are in electrical contact, by soldering or the like, with the ends of wires within the neck which transmit the current to the socket in the lamp head assembly in which a halogen bulb is mounted.

The lamp head assembly 22 is precisely as described in by above identified U.S. patent application Ser. No. 677,259.

Neck 114 is generally cylindrical in shape and has an open free end 362. The socket 358 of bulb 360 is bolted to the free end 362 of the neck by screws 364 or the like. Socket 358 is of conventional and of known construction and has a pair of diametrically opposed ribs 366 formed thereon. These ribs are used to prevent inadvertent removal of the lamp head assembly as described hereinafter.

The cylindrical sleeve defined by neck 114 includes an annular flange 367 formed therein as well as an annual groove 368 formed between the flange 367 and socket 358. These elements are used to control the position of the lamp head assembly on the neck. Finally, neck 114 includes a mounting boss 370 in which a control switch 372 is secured in any convenient manner.

The lamp head assembly is designed to insure that the surface temperature of the lamp head, particularly its peripheral edges and top surface, which are most likely to be engaged by hand by the user, will have relatively low temperatures, despite the high temperature of the bulb contained in the head. In addition, it is designed to prevent the user from looking directly as an unexposed halogen bulb, since the bright light intensity of the bulb could be damaging to the human eye.

An illustrated in FIG. 12 lamp head assembly 22 includes a support ring 380. This ring although illustrated as being circular, can have any desired shape, such as oval or oblong, and the use of the word ring is not intended to limit the configuration of this structure.

Support ring 380 is actually formed as two rings; an inner 382 and an outer ring 384 connected to the inner ring by three radial arms 386. In addition, a mounting sleeve 388 is provided integrally formed with rings 382, 384. Mounting sleeve 388 has an internal bore 390 formed therein including diametrically opposed internal grooves 392. The latter are complimentary to bosses 366 formed on the socket 358, so that the sleeve can only be put on or taken off of neck 114 when the bosses 366 and grooves 392 are aligned. This will aid in preventing inadvertent removal of the sleeve and thus the lamp head assembly 22 from the neck 114.

In order to insure against inadvertent removal, a dual purpose stand-off pin 394 is provided. This pin has a threaded upper-end 396 threadedly engaged in the outer ring 384 of the ring 380, at the location of the sleeve 388. The free end of the pin 394 enters the bore 390 of the sleeve, but the shoulder formed between the pin and its threaded portion 396 defines a stop which limits the degree of insertion of the pin into the bore 390. This arrangement permits the sleeve and thus the lamp head assembly to rotate on the neck through 360°, but prevents the lamp head assembly from being removed from the neck until the pin 394 is intentionally disengaged from the ring.

The rear end of sleeve 388 has an undercut bore portion formed therein which receives flange 366 of the neck 114. Flange 366 and the undercut bore are dimensioned such that the flange forms a stop against sleeve 388 when the head is installed on the neck, so that the groove 368 is aligned with the position of the pin 394.

The inner ring 382 of support ring 380 includes an internal flange 410 formed therein. The inner surface 420 of the inner ring 382 also includes a plurality of vertical notches 422 formed in predetermined locations along its face above the flange 410. These notches and the flange 410 serve to permit mounting of the light reflector 424 of the present invention.

Reflector 424 is a generally semi-circular or parabolic reflector formed of a plastic or metallic material. Its inner face, i.e., the side facing the bulb is preferably painted or coated with a light reflective material. The reflector has a peripheral edge portion 426 from which four fingers 428 extend. These fingers are located to be received in the grooves or notches 422 on the inner face of inner ring 382 where they will rest on the upper surface of the inner flange 410. In addition, a portion of the reflector is cut out at 430 in order to accommodate socket 358 and the neck of the lamp which enters the reflector.

Reflector 424 is perforated with small holes throughout its entire surface. For clarity and convenience only some of the perforations are illustrated in the drawing, but it is to be understood that substantially the entire surface is perforated with these small holes.

Lamp head assembly 22 includes a shade 440, preferably formed of a translucent plastic material. In the illustrative embodiment of the invention, the shade has a generally pyramidal shape in cross section, defined by a plurality of annular rings or steps. However, it is to be understood that the shape of the shade is decorative and can be formed in any desired shape. The shade has an opening 442 formed therein designed to accommodate the neck of the lamp when the shade is installed.

Shade 440 includes a central opening 444 formed therein which permits heat to escape from the lamp head assembly, and in particular form the space between the shade and reflector.

Shade 440 also includes an peripheral flange 446 which is generally complimentary to the shape and dimension of the flange 410 of the inner ring 382 of support ring 380. Flange 446 has a plurality of notches 448 formed therein.

The inner surface 420 of ring 382 includes five inwardly projecting fingers 450, which are adapted to overlie flange 446, when the shade is installed. Notches 448 in flange 446 are located to mate with and receive the fingers 450. This arrangement permits the shade to be received within ring 382 so that the bottom surface 440 of flange 446 rests on the fingers of shade 424 with the neck opening 442 slightly offset form neck 388. The shade is then rotated clockwise until four of the notches 448 overlie the fingers 450 so that the fingers enter the notches and the bottom surface 449 of flange 446 rests directly on flange 410. In this position flange 446 is located below fingers 450 and fingers 450 are contained in notches 448. As a result, the shade is locked in the ring and cannot be removed. And, in that predetermined position, the opening 442 is aligned with neck 388.

With this construction, it is not possible for the user to look directly at the bulk 360 through the shade or reflector, even at the points where the shade is mounted in the support ring. In addition, because the support ring 380 is formed as a double ring with a space between the rings 382 and 384, the periphery of the ring 380 will be cooled by convection air flow through the space between the rings. Thus, the outer ring 384 is maintained at relatively low temperatures.

A transparent protective lens 460 is also provided in lamp head assembly 22. This lens is preferably formed of lexan or other suitable plastic material. The lens can be transparent, although preferably it may be textured in order to better disburse light from the bulb.

Lens 460 is secured to ring 380 by a peripheral support ring 462. This ring includes an internal flange on which the lens sits.

The shape of the ring 462 is generally complimentary to but smaller than the shape of flange 410.

Ring 462 includes a plurality of ears or tabs 464 which extend radially outwardly from the ring. These tabs are secured to the outer ring 384 of the lamp head assembly by screws 526 or the like. By constructing the lens support arrangement to the ring 380 in this manner, a small peripheral space is formed between ring 462 and the inner face 410 of the ring 380 to allow air flow into the lamp head by convection for cooling. However, by this construction it is not possible to look directly at the bulk, even from the bottom of the lamp head assembly.

By this arrangement, it is seen that the lamp assembly of the present invention has multiple degrees of permitted movement, as indicated by the arrows in FIG. 1. The whose assembly can pivot about the bolt 58 on the mounting adapter 18 while the upper arm assembly 20 can pivot in both a horizontal and a vertical direction about the arm support 66. In addition, the lamp head assembly 22 can pivot about the horizontal axis defined by the bolt 110 and about the horizontal axis defined by neck 114.

Figure 5:
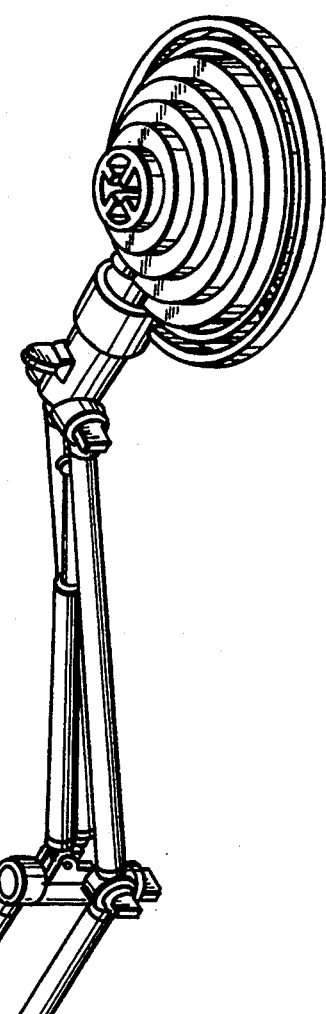
FIG. 5 is an exploded perspective view of the mounting adapter arrangement for the embodiment of FIG. 4.
Figure 4:
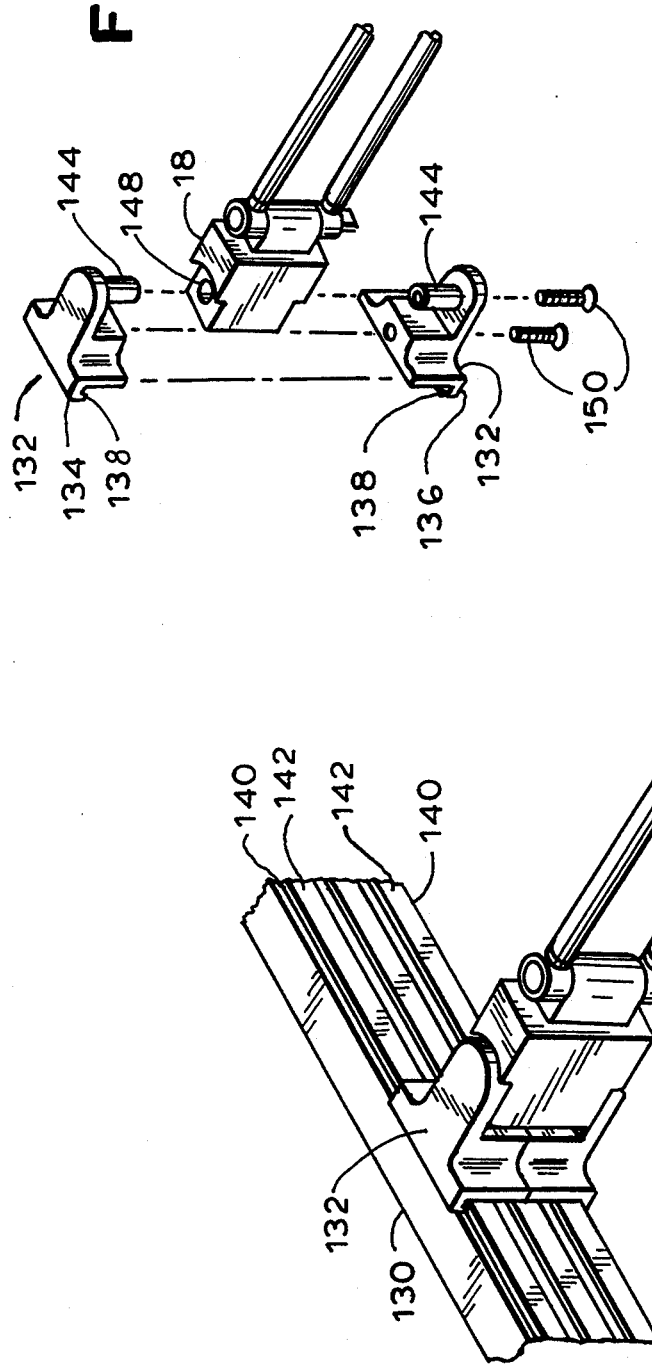
FIG. 4 is a perspective view of another mounting arrangement for the lamp of the present invention.

In another embodiment of the present invention illustrated in FIG. 4, the lamp assembly is substantially the same as previously described up to and including the mounting adapter 18. In this embodiment, the lamp assembly is mounted to a base 130 which is formed as a track assembly. A connector arrangement 132 is provided consisting of two brackets 134, 136 each of which has an inwardly turned flange 138 formed thereon adapted to receive the adjacent edges 140 of the tracks 142 formed in base 130. Connectors 132 have integral extensions 144 formed therein which are adapted to be received in an enlarged bore 148 formed in adapter 18 to provide a pivotal connection therebetween. The adapter 18 is clamped between the connectors 132 by bolts 150 which are threaded by received between the connectors as illustrated in FIG. 5. By this construction, another degree of pivotal movement is provided between the lamp assembly and the base as a result of the sliding connection defined by the connectors 132.

FIG. 6 illustrates another embodiment of the invention wherein the support post 14 is adapted to be mounted to a desk clamp 160. As seen therein a clip 162 is provided which has a pair of ears 164 formed on one end thereof defining a gap 166. The latter receives the tongue 168 of the clamp 160 therebetween. The clip is then secured to the bottom of the vertical post 14 by screws 30 which, as described above, are self-tapping screws that thread into the channels formed on the interior of the tube. This construction permits the same lamp assembly used in the embodiments of FIGS. 2 and 4 to be mounted on the edge of a piece of furniture such as a desk or the like, without effecting the operation or construction of the lamp arm assembly itself.

Figure 7:
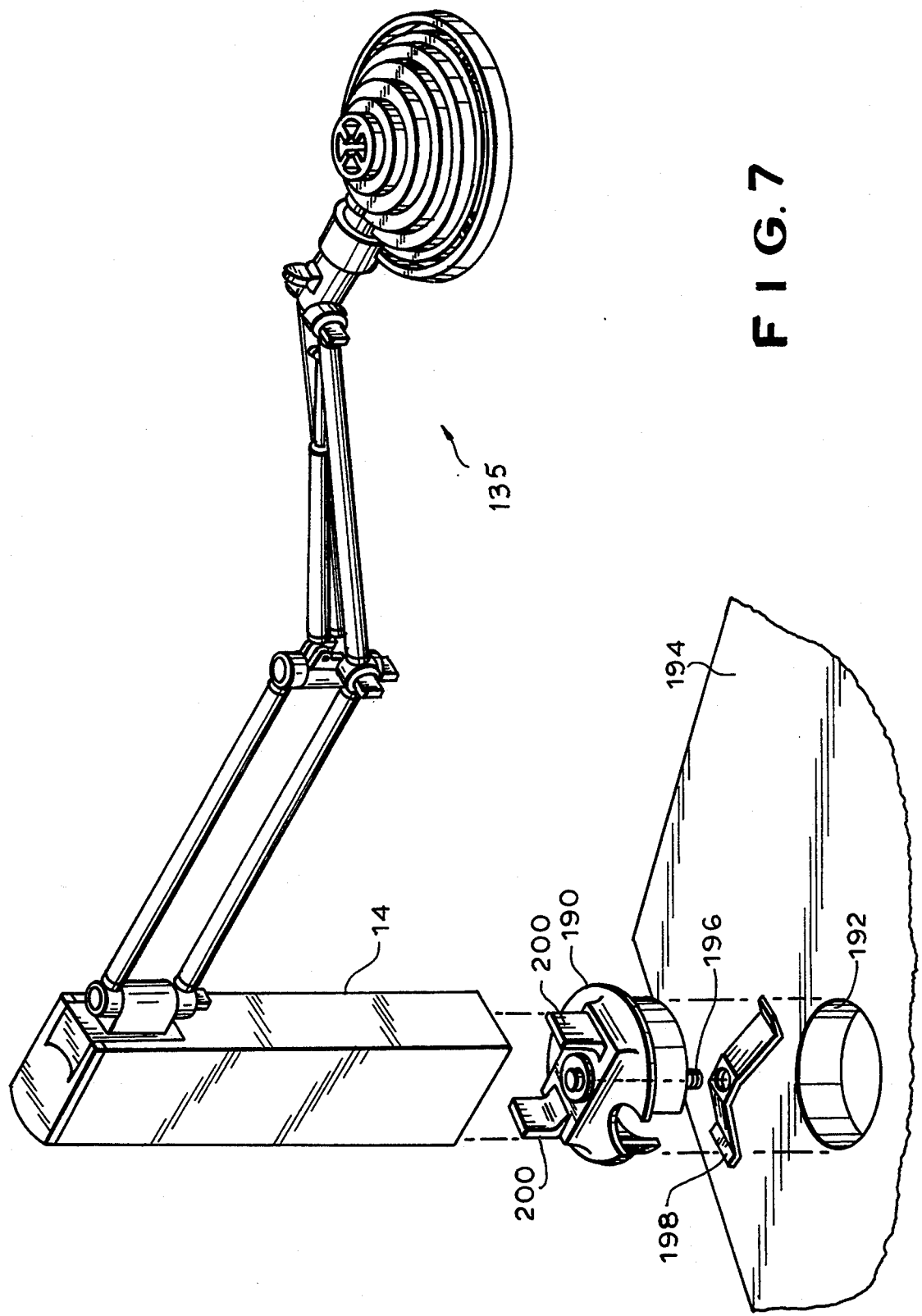
FIG. 7 is a perspective view of yet another mounting arrangement for the lamp of the present invention.

FIG. 7 illustrates yet another embodiment of the invention wherein the support post 14 is received on a pivot filler piece 190. In this embodiment the filler piece 190 is adapted to be received in a circular hole 192 formed in a desk 194 or the like. The filler piece has a bolt 196 which extends downwardly therefrom and a butterfly clamp 198 is threadedly engaged therewith to hold the filler piece on the desk by a clamping action. However, the filler piece is permitted to pivot in the hole 192.

The post 14 in this embodiment frictionally receives the ears 200 of the filler piece 190 and is supported thereon. This permits another degree of horizontal movement of the entire lamp assembly about the pivot axis of the filler piece.

FIG. 8 illustrates an embodiment of the invention adapted for use with 120 volt current and a fluorescent bulb rather than a halogen bulb. In this embodiment, the wire 26 extends through post 14 and through the hollow tubes of the arm assemblies to the neck 114 of the lamp. The latter has, instead of the head assembly 22 previously described, a conventional fluorescent bulb socket 210 formed therein for receiving the bulb 212 previously described and a shade 214 which mounts on neck 114 in any convenient manner. Accordingly it is seen that the construction of the present invention permits the same lamp construction to be used with both halogen or fluorescent bulbs, and different power supplies, without affecting the mechanical operation of the arm assembly.

FIG. 9 illustrates yet another embodiment of the invention wherein a lamp head assembly 230 is provided. In this embodiment the lamp head is pivotally mounted on another vertical axis 232 formed at the free end of the neck 114. Here again, yet another degree of pivotal movement is provided to the lamp of the invention without affecting the operation of the remainder of the arm.

FIGS. 10 and 11 illustrate another embodiment of the invention which is similar to the embodiments previously described. In this embodiment the lamp assembly 250 includes a base 12 as previously described and the same support post 14 as in the previously described embodiments. A mounting adapter 18 similar to that previously described is also provided. The adapter in this embodiment is somewhat differently shaped, as seen in FIG. 11, in that the pivot boss 52 in this case is defined by two flanges 252 extending from the front section 36 of the adapter.

In this embodiment of the invention the lower arm assembly 16 is formed from hollow arms 254 which are generally rectangular in cross-section, having pivot bosses 256 formed integrally at their ends. These pivot bosses are pivoted to the mounting adapter 18 by the bolt 258 (See FIG. 11). The outer ends of the arms 254 are pivotally connected to an arm support 260 by the bolt and nut assembly 262.

Arm support 260 has a pair of flanges 264 extending therefrom to which the upper rectangular arms 266 of the upper arm assembly 20 are pivotally mounted. The arms 266 are pivotally mounted to the flanges 264 of arm support 260 by press fit pins 270 or the like, which permit the arms to pivot on a horizontal axis in a generally vertical plane.

The outer ends of the arms 266 are pivotally connected to a universal joint mounting adapter 280. The latter includes a first section 282 having flanges 284 formed thereon which receive and pivotally secure the arms 266 to the adapter by means of the press fit pins 286 or the like. The universal joint adapter 282 includes a second section 290 pivotally connected to the first section by the pivot bolt 292 or the like, corresponding generally to the pivot bolt 262 previously described. Finally, the neck 296 of a lamp head assembly 300 is pivotally connected to the adapter section 290 by the fingerbolt and nut assembly 302. As seen in the drawings, the adapter section 290 has a pair of flanges 304 between which the rear end of the neck 296 fits, so that operation of the finger nut 302 provides a clamping action on the neck of the lamp.

The upper arm assembly in this embodiment of the present invention is counterbalanced by a spring arrangement similar to that described in U.S. Pat. No. 4,080,530 the disclosure of which is incorporated herein by reference. This spring assembly includes a tension spring 310 located within the lower hollow tube 266. The outer end of the spring is secured in any convenient or known manner to a hook 312 which engages the lower press fit pin 286 in the universal joint mounting adaptor 280. The rear end 314 of the spring is secured to a sliding shoe, as described in U.S. Pat. No. 4,080,530 which in turn is pivotally connected to a link 316. The latter may either have a hook formed on its end which engages the upper press fit pin 270 in the arm support 260 or it may have an aperture formed therein to receive that press fit pin when the components are assembled. This construction provides a counterbalancing spring force to the lamp head assembly substantially in the manner described in U.S. Pat. No. 4,080,530. By this embodiment of the invention many of the components of the original embodiment are provided in a lamp head assembly permitting for substantial interchangeability of parts. In addition, a multiplicity of degrees of freedom of movement for the lamp head assembly are provided.

Although illustrative embodiments of the present invention have been described herein with reference to the accompany drawings, it is to be understood that the invention is not limited to those precise embodiments, and that various changes and modifications may be effected therein by those skilled in the art without departing from the scope or spirit of this invention.

What is claimed is:

1. A mounting assembly for a lamp comprising a hollow elongated post having open ends and at least two internal channels adjacent each other in generally parallel relation, said at least two internal channels having open end portions and being adapted to receive mounting screws therein; a mounting block received in one end of said hollow elongated post and having first and second mounting sections, said first mounting section having a pair of throughbores formed therein for receiving mounting screws therethrough which are adapted to be received respectively in said at least two internal channels; said hollow elongated post having an open face adjacent said one end thereof and said second mounting section having a front face located in said open face of the hollow elongated post and a pivot boss formed thereon on said front face including a pivot opening formed therein for receiving a pivot mounting shaft of a lamp arm assembly.

2. A mounting assembly as defined in claim 1 including a base and means for securing another end of said hollow elongated post to the base, said means including opposed interior channels formed in the hollow elongated post and screws extending through said base and engaged in said interior channels.

3. A mounting assembly as defined in claim 2 wherein said base comprises a weighted circular disk.

4. A mounting assembly as defined in claim 2 wherein said base comprises a mounting plate secured to the other end of said hollow elongated post and a C-clamp, said plate and clamp including cooperating surfaces for engagement with each other to hold said hollow elongated post to a support surface.

5. A mounting assembly as defined in claim 1 including a base having resilient fingers extending upwardly therefrom and being frictionally received in another end of the hollow elongated post to hold said hollow elongated post on said base.

6. A mounting assembly as defined in claim 5 wherein said base is circular to plan and adapted to be received in a circular access port on a support surface.

7. A mounting assembly as defined in claim 1 wherein; said first mounting section is shorter in height than said second mounting section and positioned relative to said second mounting section to define opposed stepped surfaces on the mounting block; and a cap frictionally engaged in said one end of the hollow elongated post above said first mounting section to conceal the mounting screws therein.

8. A lamp assembly comprising a base, a lamp arm mounting adapter mounted on said base including a pivot boss formed thereon; a first pair of hollow support arms having inner and outer ends with said inner ends being pivotally mounted on the pivot boss of said mounting adapter for pivotal movement on a vertical axis and in a generally horizontal plane; an arm support pivotally mounted on the outer ends of said first pair of hollow support arms for pivotal movement on a vertical axis in a generally horizontal plane; a second pair of arms having inner and outer ends with the inner ends thereof pivotally mounted on said arm support for pivotal movement about a horizontal axis in a vertical plane; counter balance spring means connected between said arm support and said second pair of arms, and a lamp head pivotally connected to said outer ends of second pair of arms for pivotal movement at least about a horizontal axis in a vertical plane; said lamp head including a support neck pivotally connected to said outer ends of the second pair of arms and adapted to support a light bulb therein, a support ring rotatably mounted on said support neck on an axis which is located generally perpendicularly to an axis of pivotal connection of the support neck to the second pair of arms, a reflector mounted on said support ring, and a shade mounted on said support ring above said reflector.

9. A lamp assembly as defined in claim 8 wherein said counter balance spring means comprises a rigid link pivotally connected at one end to said second pair of arms and a tension spring connected at one end to the opposite end of said rigid link and at its other end to said arm support.

10. A lamp assembly as defined in claim 9 including a hollow sleeve surrounding said tension spring.

11. A lamp assembly as defined in claim 10 wherein said counter balance spring means includes a spring anchor pivotally connected to said arm support and having a threaded stem extending therefrom, said tension spring being connected to said stem and said hollow sleeve being threadedly engaged therewith surrounding the tension spring to conceal the same.

12. A lamp assembly as defined in claim 8 wherein said reflector is perforated and said shade is translucent.

13. A lamp assembly as defined in claim 12 wherein said support ring includes an internal ring member engaged with said reflector and shade and an external ring member surrounding and spaced from said internal ring member to thermally insulate said internal ring member.

14. A lamp assembly comprising a base, a lamp arm mounting adapter mounted on said base including a pivot boss formed thereon; a first pair of hollow support arms having inner and outer ends with said inner ends being pivotally mounted on the pivot boss of said mounting adapter for pivotal movement on a vertical axis and in a generally horizontal plane; an arm support pivotally mounted on the outer ends of said first pair of hollow support arms for pivotal movement on a vertical axis in a generally horizontal plane; and second pair of arms having inner and outer ends with the inner ends thereof pivotally mounted on said arm support for pivotal movement about a horizontal axis in a vertical plane; counter balance spring means connected between said arm support and said second pair of arms, and a lamp head having a support neck pivotally connected to said outer ends of second pair of arms for pivotal movement at least about a horizontal axis in a vertical plane; said first pair of hollow support arms and said second pair of arms being formed of electrically conducted materials and said arm support and support neck being formed of non-conductive materials.

15. A lamp assembly as in claim 14 wherein said first pair of hollow support arms and said second pair of arms are coated with a non-conductive material on their outer surfaces.

16. A lamp assembly as defined in claim 15 wherein the support neck is adapted to receive a halogen low voltage bulb.

* * * * *